March 26, 1935.  A. A. EMMERLING  1,996,041
ELECTRICAL REGULATOR
Filed July 29, 1932

Inventor:
Anson A. Emmerling,
by Chas V. Mullen
His Attorney.

Patented Mar. 26, 1935

1,996,041

UNITED STATES PATENT OFFICE 1,996,041

ELECTRICAL REGULATOR

Anson A. Emmerling, Albany, N. Y., assignor to General Electric Company, a corporation of New York Application July 29, 1932, Serial No. 625,946

4 Claims. (Cl. 171—119)

My invention relates to electrical regulators and more particularly to static automatic regulators employing non-linear bridge circuits and saturable core reactors.

Static type regulators, that is to say, regulators which have no moving parts, which include a non-linear Wheatstone bridge circuit as a device sensitive to a condition to be regulated and which also include a saturable core reactor under the control of the bridge circuit, are known in the art. In accordance with my invention I provide an extremely simple regulator of this type in which the unbalanced current produced by the bridge is used to control directly the saturation of the saturable reactor.

An object of my invention is to provide a new and improved electrical regulator.

A further object of my invention is to provide an extremely simple and reliable electrical regulator.

My invention will be better understood from the following description taken in connection with the accompanying drawing and its scope will be pointed out in the appended claims.

Figure 1:
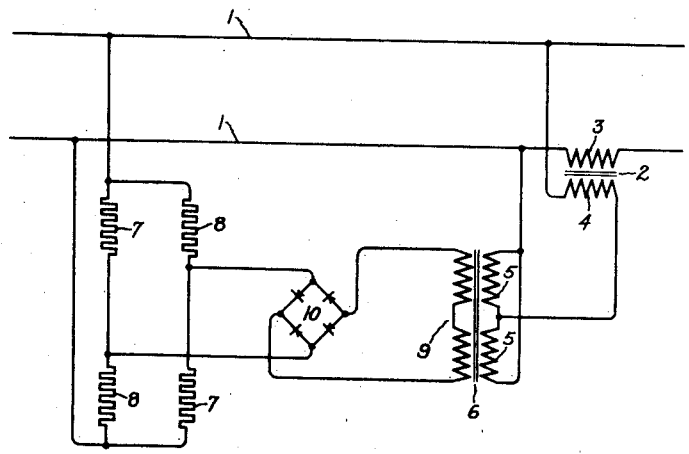
Figure 2:
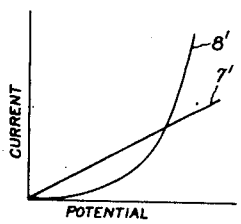

In the drawing, Fig. 1 is a diagrammatic illustration of an embodiment of my invention and Fig. 2 is a set of curves for explaining the operation of the bridge circuit.

Referring now to Fig. 1 of the accompanying drawing, I have shown an alternating current circuit 1, whose voltage is to be regulated. For this purpose I provide a booster traneformer 2 having a series, or secondary, winding in circuit 1 and a shunt, or primary, winding 4. Primary winding 4 is connected across circuit 1 through the alternating current winding 5 of a saturable core reactor 6. Connected to be responsive to the voltage in circuit 1 is a non-linear Wheatstone bridge circuit comprising linear impedance elements 7 and non-linear impedance elements 8 connected to form the four arms of a Wheatstone bridge. Electrically opposite, or non-adjacent, terminals of this bridge are connected across circuit 1 and the other terminals of the bridge are connected to the direct current saturating winding 9 of reactor 6 through a suitable rectifier 10.

Non-linear elements 8 may be of any well known type such as resistances having relatively high temperature coefficients of resistance or they may be composed of substantially instantaneously acting voltage dependent resistance material such as is disclosed and claimed in Patent No. 1,822,742, granted September 8, 1931, upon an application of K. B. McEachron, and assigned to the assignee of the present application.

The operation of my invention is as follows: The non-linear bridge circuit is so adjusted that when the voltage of circuit 1 is normal the electrical impedance, or resistance, of arms 8 will be greater than the electrical impedance, or resistance, of arms 7 of the bridge. Consequently, an unbalance current will be produced by the bridge and this unbalance current will be rectified by rectifier 10 and will pass through the direct current saturating winding 9 of the reactor, causing the alternating current winding of the reactor to have a predetermined reactance. The total voltage of circuit 1 will divide between the alternating current winding 5 of the reactor and the primary winding 4 of the booster transformer in direct proportion to their relative reactances. Consequently, a predetermined voltage boost will be produced in circuit 1 in proportion to the voltage across the primary winding 4.

It will be assumed that non-linear elements 8 of the bridge are elements whose resistance decreases with increases in voltage applied thereto. In Fig. 2 is shown the current-potential curve of such elements as compared with the same curve for linear elements. Thus the straight line 7' illustrates the current-potential curve for a linear resistance element, while curve 8' illustrates the same curve for an element whose impedance, or resistance, decreases with increases of applied voltage. As shown by curve 8' the current increases relatively more rapidly than the voltage.

Assume that the voltage of circuit 1 increases slightly. This will tend to reduce the resistance, or impedance, of arms 8 and consequently the unbalance current produced by the bridge will be decreased. This will cause a decrease in the current through the direct current winding 9 with the result that the ohmic reactance of the alternating current winding 5 of the reactor will increase. Consequently a greater proportion of the total circuit voltage will be consumed across the alternating current winding 5 and a lesser proportion will be available for producing a voltage boost in the booster transformer 2. Consequently the voltage boost will be reduced and the voltage of circuit 1 restored substantially to normal.

If the voltage of circuit 2 falls below normal the resistance, or impedance, of arms 8 increases, thereby causing the unbalance current produced by the bridge to be increased. This will cause a greater current to flow through the direct current winding of the reactor and consequently the reactance of the alternating current winding for the reactor will be decreased and the voltage across the primary winding of the booster transformer will increase. This will increase the voltage boost produced by the booster transformer and will tend to restore the voltage of circuit 1 substantially to normal.

From the above description it will be seen that the bridge circuit produces an unbalance current which varies inversely with variations in the voltage of circuit 1 from a normal value.

Although I have illustrated and described my invention in connection with the automatic regulation of voltage, it will of course be obvious to those skilled in the art that the bridge circuit may be made responsive to any one of a large number of conditions, such as current, frequency, etc., without departing from my invention.

While I have shown and described a particular embodiment of my invention, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an electric circuit, a non-linear bridge connected to produce an unbalance current which varies in accordance with variations from a normal value of a condition of said circuit to be regulated, and means for regulating said condition including, a saturable core reactor having a saturating winding connected to be traversed by said unbalance current.

2. In combination, an electric circuit, a non-linear bridge connected to be responsive to the voltage of said circuit and arranged to produce an unbalance current which varies with variations of the voltage of said circuit from a normal value, means including a saturable core reactor for varying the voltage of said circuit, said reactor having a saturating winding which is connected to be traversed by the unbalance current of said bridge.

3. In combination, an alternating current circuit, means including a saturable core reactor for varying the voltage of said circuit, a non-linear bridge circuit connected to be responsive to the voltage of said circuit and arranged to produce an unbalance current which increases with decreases in voltage of said circuit and which decreases with increases in voltage of said circuit, means for rectifying said unbalance current, and means for causing said rectified unbalance current to saturate said reactor.

4. In combination, an alternating current circuit, a booster transformer connected to said circuit, a saturable core reactor for controlling the voltage boost of said transformer, a saturating winding on said reactor, a non-linear bridge connected across said circuit, said bridge being arranged to produce an unbalance current which varies inversely with variations from a normal value of the voltage of said circuit, means for rectifying said unbalance current, and means for causing said rectified unbalance current to pass through said saturating winding.

ANSON A. EMMERLING.